(12) United States Patent
Li

(10) Patent No.: US 7,280,253 B2
(45) Date of Patent: Oct. 9, 2007

(54) SYSTEM FOR IDENTIFYING LOW-FREQUENCY HALFTONE SCREENS IN IMAGE DATA

(75) Inventor: Xing Li, Webster, NY (US)

(73) Assignee: Xerox Corporation, Stamford, CT (US)

( * ) Notice: Subject to any disclaimer, the term of this patent is extended or adjusted under 35 U.S.C. 154(b) by 1012 days.

(21) Appl. No.: 10/217,197

(22) Filed: Aug. 9, 2002

(65) Prior Publication Data

US 2004/0027614 A1  Feb. 12, 2004

(51) Int. Cl.
  *G06K 15/00* (2006.01)
(52) U.S. Cl. ............... 358/3.06; 382/224; 382/173; 382/192; 382/194; 345/596; 345/611
(58) Field of Classification Search ............... 358/3.06; 382/224, 173, 194, 192; 345/596, 611
  See application file for complete search history.

(56) References Cited

U.S. PATENT DOCUMENTS

| 4,573,178 | A  | * | 2/1986  | Morito ............... 377/97 |
| 5,767,978 | A  | * | 6/1998  | Revankar et al. ........... 358/296 |
| 6,178,260 | B1 | * | 1/2001  | Li et al. ............... 382/173 |
| 6,185,336 | B1 |   | 2/2001  | Clark et al. ............... 382/224 |
| 6,229,923 | B1 | * | 5/2001  | Williams et al. ............. 382/224 |
| 6,272,240 | B1 | * | 8/2001  | Li et al. ............... 382/173 |
| 6,347,153 | B1 | * | 2/2002  | Triplett et al. ............... 382/224 |
| 6,360,009 | B2 | * | 3/2002  | Li et al. ............... 382/176 |
| 6,389,164 | B2 | * | 5/2002  | Li et al. ............... 382/176 |
| 6,411,735 | B1 |   | 6/2002  | Williams et al. ............. 382/224 |
| 6,483,941 | B1 | * | 11/2002 | Li ............... 382/167 |
| 6,529,629 | B2 | * | 3/2003  | Li et al. ............... 382/176 |
| 6,639,692 | B1 | * | 10/2003 | Li et al. ............... 358/2.1 |
| 6,747,758 | B1 | * | 6/2004  | Nishida ............... 358/1.9 |
| 6,782,129 | B1 | * | 8/2004  | Li et al. ............... 382/176 |
| 7,031,530 | B2 | * | 4/2006  | Driggs et al. ............... 382/228 |
| 2001/0016072 | A1 | * | 8/2001  | Li et al. ............... 382/224 |
| 2001/0016073 | A1 | * | 8/2001  | Li et al. ............... 382/224 |
| 2002/0012475 | A1 | * | 1/2002  | Li et al. ............... 382/270 |
| 2002/0196465 | A1 | * | 12/2002 | Ohta ............... 358/1.16 |
| 2005/0271277 | A1 | * | 12/2005 | Lin et al. ............... 382/191 |

FOREIGN PATENT DOCUMENTS

JP        2000134472 A    *   5/2000

OTHER PUBLICATIONS

Peter Meer and Bogdan Georgescu, Edge Detection with Embedded Confidence, Dec. 2001, IEEE Transactions on Pattern Analysis and Machine Intelligence, vol. 23, No. 12.*
Theophan Nitsa and Jennifer R. Alford, An Application of Fractual Analysis in Halftoning, 1997, Journal of the SID 5/3.*

* cited by examiner

*Primary Examiner*—Twyler Lamb
*Assistant Examiner*—Jacky X. Zheng
(74) *Attorney, Agent, or Firm*—R. Hutter

(57) ABSTRACT

In a system, such as in a digital copier, for classifying image data derived from an original image, the image data is enhanced before submission to a classification analysis. In the enhancement, portions of the image having a measured roughness (degree of gray level discontinuity) within a certain range are artificially increased in roughness. This increased roughness in the enhanced image data serves to increase confidence of the classification analysis for detecting low-frequency halftone screens, so that such low-frequency halftone areas are not misclassified as contone or high-frequency halftone areas.

6 Claims, 4 Drawing Sheets

SYSTEM FOR IDENTIFYING LOW-FREQUENCY HALFTONE SCREENS IN IMAGE DATA

TECHNICAL FIELD

The present invention relates to an image processing method and system. More particularly, the invention relates to classifying data from an original input image as a low-frequency halftone screen.

BACKGROUND

In digital reproduction of documents such as in the digital copier environment, a document is first optically scanned and converted to a gray scale image. In the case of color reproduction, the document may be converted to a gray scale image of several separations, such as the R, G and B separations.

In order to produce a hard copy of the scanned and digitized image, the image has to be further processed according to the requirements of the marking engine. For example, if the marking engine is capable of bi-level printing, then the image has to be rendered into a 1-bit bit map for printing. To preserve the appearance of a gray scale image in a binary output, often some digital halftoning process is used in which the multi-bit input image is screened with a periodic array. However, if the original image itself contains halftone screen, objectionable moire patterns may occur due to the interference between the original and the new screens. Also, while dot screen halftoning may be good for rendering continuous tone originals, it may degrade the quality of text and line drawings. Often a document contains different types of images.

In order to achieve optimal image quality in document reproduction, a system capable of automatically identifying different types of images on or within a scanned original image is needed. For example, if an image part is identified as halftone, then some kind of low-pass filtering may be applied prior to halftone screening so the gray scale appearance can be preserved without introducing moire patterns. For text area, some sharpness enhancement filter could be applied and other rendering techniques such as thresholding or error diffusion could be used.

In classifying images or portions of images for the most suitable processing for subsequent printing or other purposes, one specific source of error is the misclassification of other types of images as "low frequency halftones." For example, some pixels in continuous-tone (contone) area could be falsely detected as peaks or valleys due to noisiness or other reasons. In high-frequency halftone area, some peaks or valleys are not detected, due to the weakness of the signal or other reasons. These areas will appear to be of halftone dot frequency (peak and valley count over a length within the image) which falls into the range of low-frequency halftones. A contone or high-frequency halftone image is liable to be classified incorrectly as a low-frequency image, and be processed accordingly, and vise versa. The consequences of misclassification of image data could include inefficiency in processing the image data, and undesirable artifacts in any subsequent printed image, such as a digital copy.

DESCRIPTION OF THE PRIOR ART

U.S. Pat. Nos. 6,272,240; 6,360,009; and 6,389,164 describe various techniques for classifying or "segmenting" areas in an original image, such as to identify halftone-screen regions.

U.S. Pat. Nos. 6,411,735; and 6,185,336 disclose alternate techniques for classifying images.

SUMMARY OF THE INVENTION

According to one aspect of the present invention, there is provided a method of classifying image data, the image data including a sequential line of pixel data having a plurality of pixels. For each pixel in the line, a roughness associated with the pixel is determined. If the roughness of a pixel is less than a predetermined low roughness threshold, the roughness associated with the pixel is set to a predetermined default roughness value, thereby yielding enhanced image data. The enhanced image data can then be submitted to a classification analysis.

DETAILED DESCRIPTION

Figure 1:
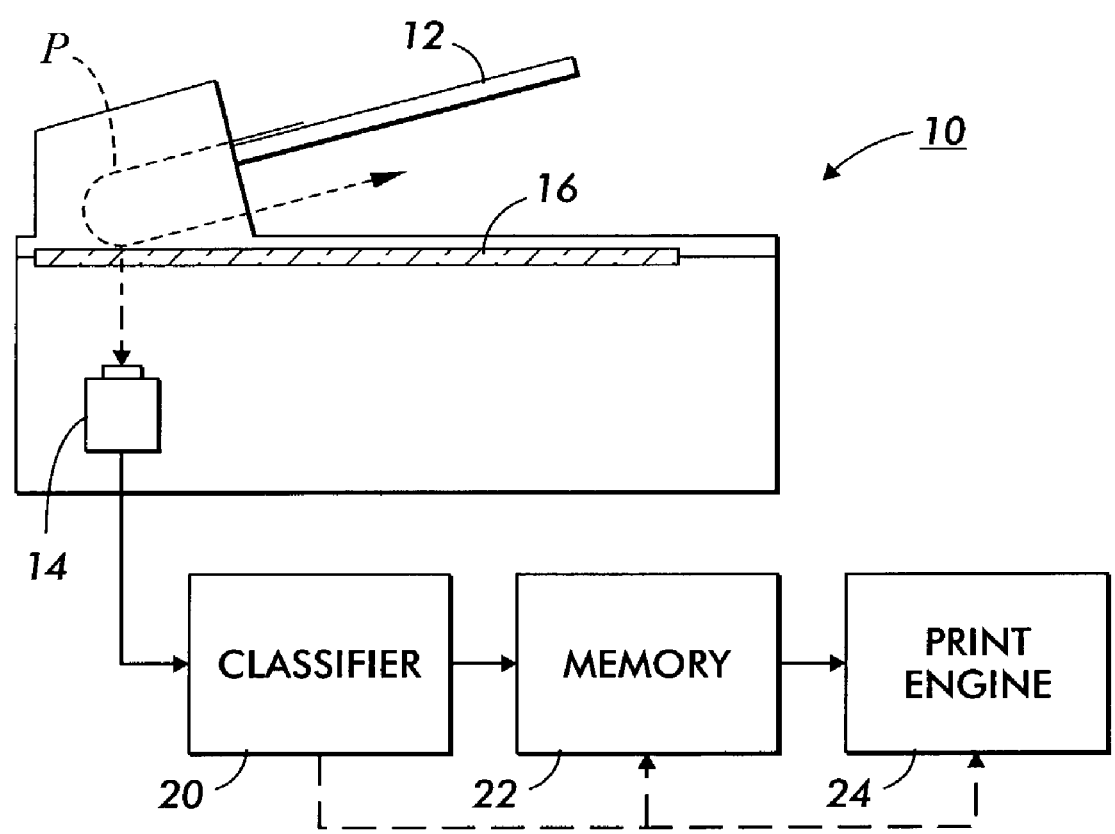
FIG. 1 is a diagram showing the elements of an input scanning and image processing system as would be used in a digital copier or other context.

FIG. 1 is a diagram showing the elements of an input scanning and image processing system as would be used in a digital copier or other context. An input scanner generally indicated as 10, which is typically but not necessarily part of a larger device such as a digital copier or facsimile machine, draws sheets bearing original images to be scanned from an input tray 12 and moves the sheet through a process direction P relative to a photosensor chip (or assembly) 14, of a type well-known in the art, which converts reflected light from a series of small areas on the sheet into image data which is ultimately digitized. Alternately, a single sheet bearing an image can be placed on platen 16, and the chip 14 moves relative thereto to scan the image.

Downstream of the scanner 10 is what is here called a "classifier" 20, which is here separated out from other functions for sake of explanation, but which can in effect be part of a larger image-processing system. The function of classifier 20 is to take the raw image data from scanner 10 and classify the image data, or specific parts thereof, as, for example, text data, contone data (as would be derived, for instance, from a silver-halide photograph), or halftone-screen data. The classification of any portion of image data as text, contone, halftone, or any other relevant type is useful in subsequent processing of the data, such as in memory 22 or in a print engine such as 24 for making copies of the original image. Even if the image data is not subsequently printed, a correct classification is useful when, for example, image data in memory is attempted to be applied to an optical character recognition (OCR) or other pattern-recognition program (not shown), or if the image is desired to be sent by facsimile (not shown). Thus, the classification of some image data from classifier 20 can be sent downstream to the memory 22 or the control system governing the print engine 24.

Figure 2:
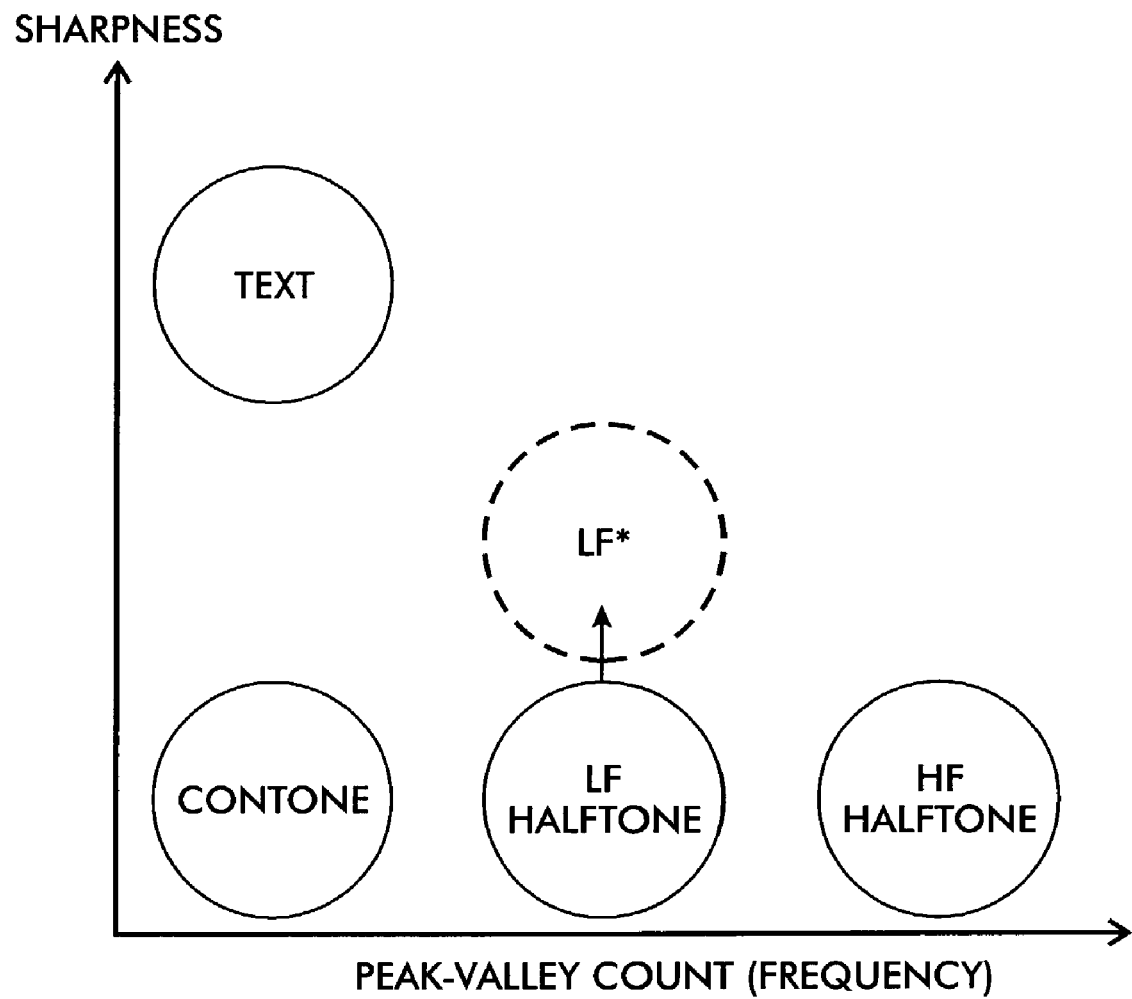
FIG. 2 is a diagram illustrating the principle of identifying low-frequency halftone areas in an image.

FIG. 2 is a diagram illustrating the principle of identifying low-frequency halftone areas in an image. In the graph of FIG. 2, the x-axis represents an increasing frequency of "peaks and valleys" of image darkness or lightness over a unit length of the image: a peak or valley would be consistent with a spot of local dark or light area in the image. The y-axis represents an increasing sharpness of a portion of an image, that is, a relatively abrupt change in intensity from light to dark or vice-versa over a unit of length in the image; the more sudden the change from dark to light, the "sharper" the image portion, as opposed to a relatively gradual change in light intensity over a unit length. Broadly, if the diagram of FIG. 2 is used as a histogram, different types of images can be classified by the general location of the accumulated image data within the histogram. A relatively high frequency of peaks and valleys along a unit length would be characteristic of a halftone screen in the original image, as shown by the "HF halftone" zone in FIG. 2. If the image data is largely characterized by low sharpness and low frequency, the image data is likely to be that of a contone image, as shown. If the image data is low-frequency but high sharpness, it is likely that the image is bearing text, as shown.

As mentioned above, a common source of classification error is the false identification of low-frequency halftones due to either false detection of peaks or valleys in contone areas or missing peaks or valleys in high-frequency areas which results in relatively low-frequency (i.e., relatively widely spaced) placement of local peaks and valleys. The typical location in a histogram of such falsely identified low-frequency halftone data is shown in the zone marked "LF halftone" in FIG. 2. A function of the present embodiment is to increase the confidence of characterizing certain image data as a low-frequency halftone, as opposed to another type of image.

One technique for increasing the confidence is to manipulate the image data, at least on a provisional or temporary basis, to artificially increase the sharpness of suspected low-frequency halftone data. The artificial increase in sharpness will cause the real low-frequency data to migrate, in the histogram, toward the increased-sharpness zone shown as LF* in FIG. 2. Under certain conditions, this artificial migration will serve to clearly distinguish low-frequency halftone image data from either contone or high-frequency data.

Figure 3:
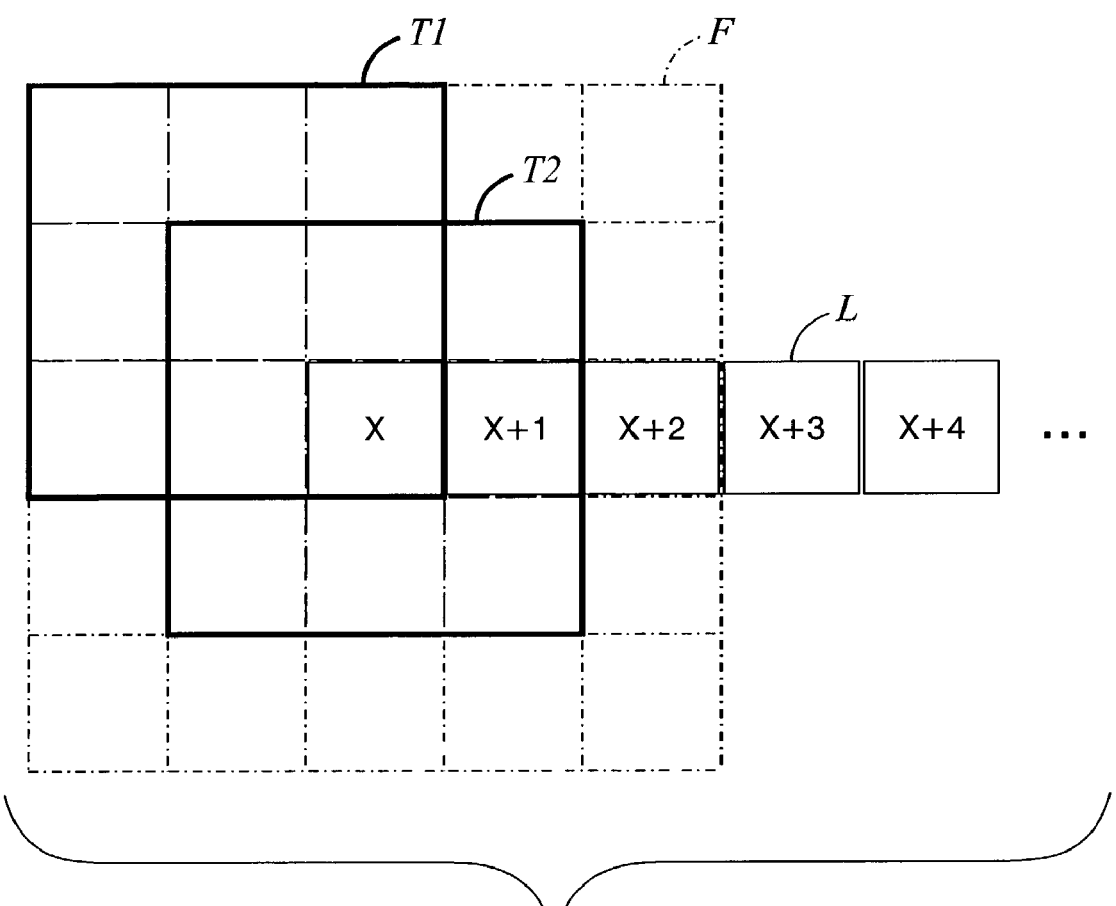
FIG. 3 is a diagram illustrating a principle of the present invention.

According to one embodiment of the present invention, this manipulation or enhancement of the image data can be performed by a recursive technique carried out on a sequence of pixel-based image data, as would be found along one dimension or line through an image to be analyzed. The principle related to the present invention is illustrated in FIG. 3, with regard to a pixel of interest indicated as X, which is disposed along a line L within an image being analyzed. The technique according to the present embodiment is shown by the flowchart of FIG. 4.

The recursive technique involves determining a "roughness" of a portion of an image around a pixel being considered, and also maintaining a "hysteresis" count (hyscount) which takes into account the visual effect of neighboring pixels along the scan line. In general, roughness is defined as the degree of gray level discontinuity within a window of a certain number of pixels around a pixel of interest. For instance, a 5×5 pixel window around a pixel of interest will show a high roughness if a certain number of the surrounding pixels are very dark and the rest are very light:

a high-roughness area would be consistent with, for example, an area including the edge of a text character. In this embodiment, roughness is calculated as the difference between the maximum and minimum of the nine 3×3 pixel window sums of lightness values within a 5×5 pixel context around the pixel of interest; two example 3×3 windows, marked T1 and T2, of a possible nine within a 5×5 context marked F, are shown in FIG. 3. This type of roughness calculation is basically described in, for example, U.S. Pat. No. 6,389,164 referenced above.

Figure 4:
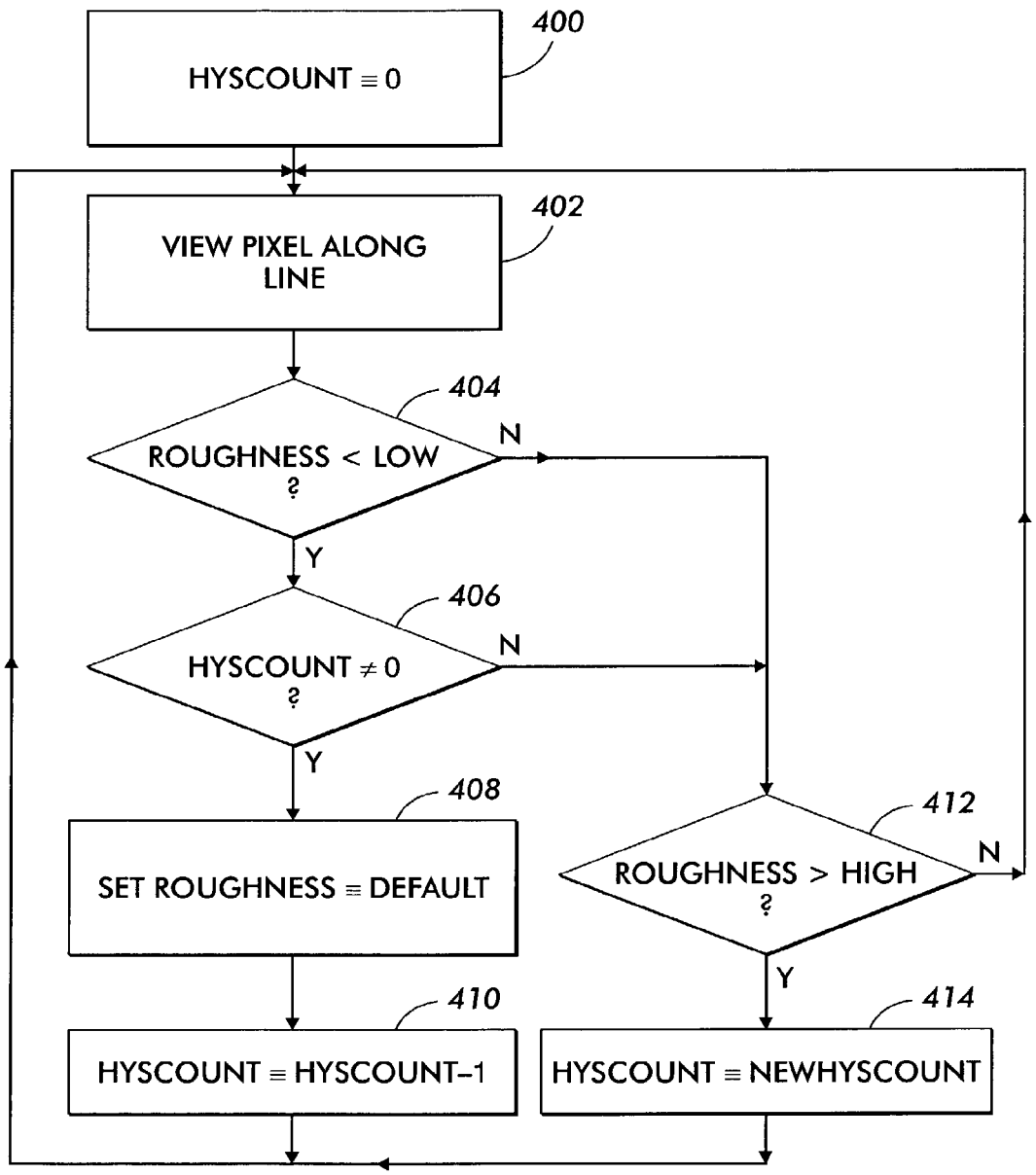
FIG. 4 is a flowchart illustrating a practical embodiment of the present invention.

With regard to FIG. 4, for a line of pixels L in an image being analyzed, a hyscount is set to zero for the beginning of the line (step 400). A pixel of interest, such as X in FIG. 3, is then considered (step 402); the technique is successively applied to all the pixels along this line, as will be seen below.

If the roughness around the pixel of interest is below a certain low threshold (step 404), and the hyscount is not zero (step 406) the roughness associated with the pixel is artificially set to a predetermined level (step 408), and the hyscount is decremented (step 410), in effect decreasing the influence of the values of neighboring pixels on the technique. If the roughness is above a high threshold (step 412), the hyscount is reset, typically to a nonzero number (step 414), which causes the values of neighboring pixels along the line L to have an influence on the roughness value. The method then returns to step 402, for analysis of the next pixel in the line, such as X+1, X+2, etc., as shown in FIG. 3, using as needed the hyscount value "left over" from analysis of the previous pixel.

The effect of the technique shown in FIG. 4 on a line of pixel data such as shown in FIG. 3 is to artificially increase the sharpness (abruptness of changes in darkness) along the line of pixels. By a proper selection of the low (step 404) and/or high (step 412) thresholds, or the artificial hyscount values such as in step 414, such an enhancement to the image data is useful for isolating true low-frequency halftone data, by causing the low-frequency halftone data to in effect migrate to the LF* area in the histogram of FIG. 2. By analyzing the histogram with the artificially enhanced data, a segmentation or classification system such as shown as 20 in FIG. 1 can make relatively high-confidence classifications of low-frequency halftone versus contone or low-frequency versus high-frequency halftone data. It should be noted that image "roughness" such as described with reference to FIGS. 3 or 4 is related to, but not synonymous with, the "sharpness" such as described with reference to FIG. 1. Once again, the enhancement alteration such as shown in FIG. 4 is only temporary or provisional, for classification or segmentation purposes only; the original, unenhanced image data is likely to be used for subsequent processing or printing.

One practical advantage of the embodiment is that the recursive technique can be applied to a one-dimensional line of pixels through an image, which facilitates rapid calculation.

The invention claimed is:

1. A method of obtaining and processing image data, comprising;
    scanning an original image to obtain original image data, the original image data including at least one sequential line of pixel data having a plurality of pixels:
    for each pixel in the line, determining a roughness associated with the pixel;
    if the roughness of a pixel is less than a predetermined low roughness threshold, setting the roughness associated with the pixel to a predetermined default roughness value, thereby yielding enhanced image data;

submitting the enhanced image data to a classification analysis;

submitting the original image data for subsequent processing, using a result of the classification analysis performed on the enhanced image data; and following the processing, writing the processed image data to a memory.

2. The method of claim 1, further comprising during the determining step, maintaining a hysteresis count for each pixel in the line of pixel data;

if, for a pixel in the line, if the roughness is less than the predetermined low roughness threshold, decrementing the hysteresis count for a subsequent pixel in the line.

3. The method of claim 1, further comprising during the determining step, maintaining a hysteresis count for each pixel in the line of pixel data;

if, for a pixel in the line, if the roughness is greater than a predetermined high roughness threshold, setting the hysteresis count for a subsequent pixel in the line to a predetermined new value.

4. The method of claim 1, further comprising during the determining step, maintaining a hysteresis count for each pixel in the line of pixel data; and wherein the setting the roughness to a predetermined default roughness value step occurs only if the hysteresis count for the pixel is not zero.

5. The method of claim 4, wherein roughness is calculated as a difference between a maximum and minimum darkness values of a plurality of small pixel window sums within a large pixel context around the pixel.

6. The method of claim 1, wherein the determining is applied to a one-dimensional line of pixels in an image.

* * * * *